(12) United States Patent
Chang et al.

(10) Patent No.: US 10,950,268 B1
(45) Date of Patent: Mar. 16, 2021

(54) RADIALLY PATTERNED MEDIA FOR CIRCUMFERENTIALLY CONSTRAINED GRAIN GROWTH

(71) Applicant: Seagate Technology LLC, Cupertino, CA (US)

(72) Inventors: Thomas Y. Chang, Menlo Park, CA (US); Philip L. Steiner, Los Altos, CA (US); Xiaomin Yang, Livermore, CA (US); Bin Lu, San Ramon, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/723,904

(22) Filed: Dec. 20, 2019

(51) Int. Cl.
G11B 5/74 (2006.01)
G11B 5/596 (2006.01)

(52) U.S. Cl.
CPC .......... *G11B 5/746* (2013.01); *G11B 5/59627* (2013.01)

(58) Field of Classification Search
CPC ......... G11B 5/855; G11B 5/712; G11B 5/746; G11B 5/8404; G11B 5/743; G11B 5/72; G11B 20/10268; G11B 5/58; G11B 5/74; G11B 5/667; G11B 5/738; G11B 5/7325
USPC ........... 360/48, 55, 135, 77.08, 77.03, 78.11, 360/77.02, 75, 77.01; 428/826, 827, 828, 428/829
See application file for complete search history.

(56) References Cited

U.S. PATENT DOCUMENTS

| | | | |
|---|---|---|---|
| 6,421,195 B1 * | 7/2002 | Rubin | B82Y 10/00 360/135 |
| 6,937,421 B2 * | 8/2005 | Rubin | B82Y 10/00 360/48 |
| 7,713,591 B2 * | 5/2010 | Albrecht | G11B 5/855 427/130 |
| 7,776,388 B2 * | 8/2010 | Dobisz | B82Y 10/00 216/41 |
| 7,894,155 B2 * | 2/2011 | Sakurai | B82Y 10/00 360/48 |
| 7,978,434 B2 * | 7/2011 | Kimura | B82Y 10/00 360/131 |
| 8,824,084 B1 | 9/2014 | Gurney et al. | |
| 9,245,566 B2 | 1/2016 | Xiao et al. | |
| 9,373,349 B1 * | 6/2016 | Erden | G11B 5/746 |
| 9,966,096 B2 * | 5/2018 | Chen | B05D 1/00 |
| 2007/0042229 A1 * | 2/2007 | Albrecht | G11B 5/852 428/836 |
| 2015/0248909 A1 | 9/2015 | Gurney et al. | |

* cited by examiner

*Primary Examiner* — Nabil Z Hindi
(74) *Attorney, Agent, or Firm* — Holzer Patel Drennan (57) ABSTRACT

A method of forming a patterned media includes constraining growth of magnetic grains in a down-track direction without constraining the growth in a radial direction to cause the magnetic grains to align in rows extending in the radial direction. The patterned media may allow for data track radial width to be defined independent of grain size.

18 Claims, 12 Drawing Sheets

RADIALLY PATTERNED MEDIA FOR CIRCUMFERENTIALLY CONSTRAINED GRAIN GROWTH

BACKGROUND

Areal recording densities of magnetic storage devices are believed to be capped by superparamagnetic limit, which refers to an areal density limit at which thermal fluctuations in the media spontaneously switch the polarization of recorded bits within a relatively short time, causing data loss. The areal density of the superparamagnetic limit depends upon both the media grain size and magnetic anisotropy. It is thought that the superparamagnetic limit may be deferred by increasing media anisotropy or by increasing effective grain volume. While increasing anisotropy can be achieved using a relatively large switching field (e.g., via techniques such as heat-assisted magnetic recording), increasing effective grain volume is believed to require either thicker media or increased physical grain alignment via patterning of the media, also known as "bit patterned media (BPM)".

In BPM devices, magnetic material on a disc is patterned into small isolated islands or "grains" such that there is a single magnetic domain in each island or "grain." The single magnetic domains can be a single grain or a plurality of strongly coupled grains that switch magnetic states in concert as a single magnetic volume. This is in contrast to continuous media wherein a single "bit" may have multiple magnetic domains separated by domain walls. The media may be fabricated so that there is no magnetic material in the regions between the blocks.

SUMMARY

An example method for forming a patterned media provides for constraining growth of magnetic grains in a down-track direction of the patterned media without constraining growth of the magnetic grains in a radial direction of the patterned media to cause the magnetic grains to substantially align in rows extending in the radial direction. The patterned media may allow for data track radial width to be defined independent of grain size and while also providing information that allows for precise write transition timing without need for a separate write sync field in each data sector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Bit patterned media (BPM) technology presents a number of practical implementation challenges. Due to small grain size and magnetic grain isolation, BPM devices generally operate with a lower bit aspect ratio (BAR), or the ratio of track pitch to bit-length in the down-track direction, than conventional recording devices that utilize continuous media. In general, low BAR is correlated with lower data throughput rates when sequentially reading and writing data from the media. In addition to yielding lower data rates, the smaller track widths associated with lower BAR presents a need for narrower recording head features. Since narrower read elements output a readback signal with lower amplitude than wider read elements, low BAR devices (e.g., those employing BPM) drive demand for higher sensitivity read elements, escalating manufacturing costs and complexity. If BPM could be practically implemented in a device with a BAR that is similar to (e.g., not substantially lower than) the BAR of conventional recording devices, such design would therefore give rise to substantial performance and manufacturing benefits.

In addition to the above-described impediments to practical BPM implementations, still further challenges arise from the fact that BPM devices theoretically require more advanced and dynamic servo tracking systems than storage devices using conventional storage media. In BPM, each bit of data is written by precisely aligning the recording head to both the down-track and cross-track position of a pre-patterned magnetic island. In contrast, conventional recording systems utilize encoded servo information to radially align the recording head along a target data track, but there is no such tracking requirement in the down-track direction. Rather, the down-track position of individual data bits is selected based on the position of the head as it flies above the media—a model that offers significantly reduced cost and complexity compared to current BPM designs. Therefore, BPM would be significantly less complex to implement if tracking requirements could be relaxed and/or of the write-sync in the down-track direction could be eliminated.

The technology disclosed herein provides techniques for radially-patterning media that may be incorporated into a patterned media storage device in a manner that allows for a higher bit aspect ratio (BAR) and hence, better performance, than existing BPM technologies (e.g., read/write throughput may be similar to conventional storage media). Additionally, the disclosed techniques may facilitate methods for relaxing head tracking requirements in a patterned media drive. According to one implementation, a patterned media disclosed herein includes magnetic grains that are aligned or substantially aligned in the radial direction and staggered (e.g., not aligned or substantially aligned) in the down-track direction. As used herein, grains said to be aligned in a row when either (1) each magnetic grain in the row has a center substantially aligned along a common axis or (2) each magnetic grain in the row has an edge substantially aligned along a common axis. "Substantially aligned" refers to an alignment that is within one-quarter of a bit pitch of an actual precise alignment, where a "bit pitch" refers to the average center-to-center separation between adjacent bits (data-storing magnetic grains) on the media. Further examples of radially-aligned grains (e.g., center-to-center alignment and edge-to-edge alignment) are discussed below with respect to FIG. 2A-2C.

When the media is patterned with grains that are radially-aligned in individual rows, long-range ordering is observed in the down-track position which provides sharp boundaries for predictable timing of write transitions. Due to this predictable transition timing, servo fields may be stored periodically at highly predictable locations (e.g., at the same collection of rows as the user data) and the servo sync field may in this case double as a write sync field. In contrast, some earlier forms of BPM require a write sync field separate from the servo sync field in order to position the write element relative to the data portion of each sector. However, the predictable transition timing of the disclosed design allows the write sync for the data field to be derived from the servo sync field.

At the same time, a pattern that allows the grains to be staggered (unaligned) in the down-track direction relaxes head positioning requirements by allowing the recording head dimensions to define the location and width of each data track. Stated differently, the disclosed patterning techniques may provide the beneficial effect of deferring the superparamagnetic limit without requiring a low BAR for acceptable performance, and without a need for narrower, more sensitive head features or servo tracking capabilities that are more advanced than those common in conventional magnetic recording devices.

Figure 1:
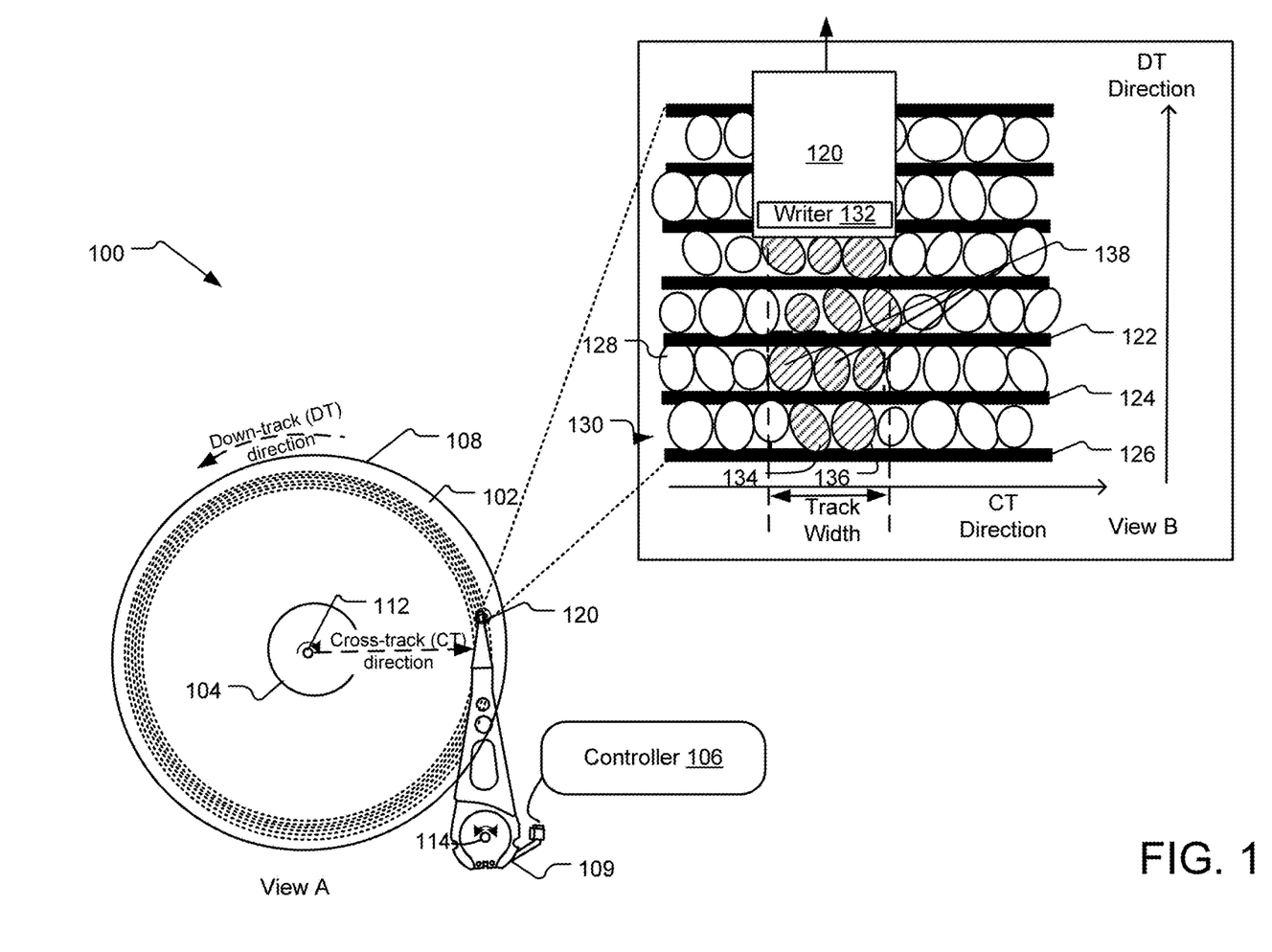
FIG. 1 illustrates an example data storage device that includes a patterned media with magnetic grains that are aligned in a single direction (1D).

FIG. 1 illustrates an example data storage device 100 that includes a patterned media 108 with magnetic grains that are aligned in a single direction (1D). The patterned media 108 includes at least one magnetic storage disc on which data bits can be recorded using a magnetic write pole (not shown) on a transducer head assembly 120 and from which data bits can be read using a magnetoresistive element on the transducer head assembly 120. As illustrated in View A, the patterned media 108 rotates about a spindle center or a disc axis of rotation 112 and includes an inner diameter 104 and an outer diameter 102 between which are a number of concentric data tracks.

The transducer head assembly 120 is mounted on an actuator assembly 109 at an end distal to an actuator axis of rotation 114. The transducer head assembly 120 flies in close proximity above the surface of the patterned media 108 during disc rotation. The actuator assembly 109 rotates during a seek operation about the actuator axis of rotation 114. The seek operation positions the transducer head assembly 120 over a target data track for read and write operations.

In one implementation employing heat-assisted magnetic recording (HAMR) magnetic grains on the patterned media 108 are temporarily heated during the recording process to selectively lower magnetic coercivity in a tightly focused area of the patterned media 108 that substantially corresponds to an individual data bit. The heated region is then encoded with the recorded data bit based on the polarity of an applied magnetic write field. After cooling, the magnetic coercivity substantially returns to its pre-heating level, thereby stabilizing the magnetization for that data bit. This write process is repeated for multiple data bits on the storage medium, and such data bits can be read using a magneto-resistive read head.

As shown in View B, the patterned media 108 includes magnetic islands or grains (e.g., a grain 128) formed on the patterned media 108 at fixed locations separated from one another by non-magnetic material. In FIG. 1, the magnetic grains are aligned or substantially aligned in rows extending the cross-track (radial) direction but not aligned along the individual columns extending in the down-track direction (also referred to as the recording direction).

According to one implementation, this radial-direction alignment within individual rows of grains is the result of a media manufacturing process that makes use of grain-growth-constraining features (e.g., grain-growth-constraining features 122, 124, 126) to limit size and position of each one of the magnetic grains in the down-track direction. For example, the grain-growth-constraining features 122, 124, 126 may be features that are patterned on a substrate that serve as boundaries physically restricting magnetic grain growth in the down-track direction. In different implementations, the grain-growth-constraining features 122, 124, 126, may assume a variety of different forms including, for example, positive features (e.g., lines of segregant material formed on a nucleation layer for the patterned media) or negative features (e.g., etched valleys).

When the magnetic grains are grown on a seed layer of the patterned media 108, the grain-growth-constraining features (e.g., 122, 124, or 126) constrain the position of each individual magnetic grain between an upper and lower bound in the down-track direction. For example, all magnetic grains formed in row 130 are prohibited from expanding in the down-track position beyond either one of the immediately adjacent grain-growth-constraining features 124 and 126. At the same time, these magnetic grains are permitted to nucleate and grow in random positions in the radial (cross-track) direction, which simplifies manufacturing of the patterned media 108 as compared to processes that provide multi-dimensional constraints on magnetic grain position.

In the illustrated implementation, a controller 106 of the storage device 100 is configured to control the writer 132 to generate the magnetic transitions in the magnetic granular material of the patterned media 108 to store data. The controller 106 of FIG. 1 may include software stored on a tangible computer-readable storage medium. As used herein, the term "tangible computer-readable storage media" excludes transitory propagating signals (e.g., carrier waves) but includes physically-manufactured media (memory devices) including without limitation RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer.

In one implementation, the controller 106 controls the writer 132 to generate the magnetic transitions such that each single data bit is stored as a collection (group) of adjacent grains on patterned media 108 of like-polarity that are transitioned as a single unit to a same magnetic polarity. Stated differently, multiple (e.g., two or three) magnetic grains on the patterned media 108 may be encoded to a same magnetic polarity and to collectively represent one stored data bit of information. The group of grains corresponding to each single data bit is, in FIG. 1, defined to be those grains that are (1) between a same pair of the grain-growth-constraining features (122, 124, 126, etc.) and (2) that have a radial position corresponding to a magnetic footprint of the writer (e.g., those bits that are magnetized enough to transition in magnetic polarity when the writer passes overhead, as shown). For example, the magnetic grains 134 and 136 are between the grain-growth-constraining features 124 and 126 and have centers internal to the "track width" footprint of the writer 132. These grains collectively store a first data bit. Likewise, a trio of magnetic grains 138 are positioned between the grain-growth-constraining features 122 and 124 that have centers internal to the "track width" footprint of the writer 132. These three grains are transitioned together to store a second data bit.

As the writer 132 passes over the fixed data bits of the rotating patterned media 108, the writer 132 emits a series of magnetic pulses each of sufficient magnitude to perform a write transition that changes a magnetic state of an underlying data bit. To selectively write an individual data bit to a group of grains, the magnetic pulses of the writer 132 are timed to align with the passing of each one the grain-growth-constraining features (e.g., 122, 124, 126), in series, beneath the writer 132. If the writer 132 is misaligned during a write transition, then the corresponding misalignment of the magnetic pulse can cause a bit to experience conflicting magnetization forces from the writer, resulting in improperly written data and stored data corruption. In the illustrated example, the magnetic grains 134 and 136 are transitioned together to store the first data bit Using multiple grains to store individual data bits, as described above, may desirably boosts read-back signal amplitude. Moreover, since the down-track intervals between grains in the present design are not staggered but instead ordered, the write transitions may be precisely timed based on the position of the grain-growth-constraining features, resulting in a high signal-to-noise ratio (SNR) even when relatively few grains (e.g., two or three) grains correspond to each bit of recorded data. Even with this relatively small grain size, the patterning on the patterned media 108 may scale to support higher areal densities beyond those of conventional recording before hitting the paramagnetic limit.

In addition to providing improved signal quality for a patterned media technology, the storage device 100 can also operate at a higher BAR (e.g., the ratio of track-width to down-track bit length) because track width and position is defined by the position and size of the write element on the transducer head assembly 120 rather than the radial-direction center of each magnetic grain. Using physical properties of the transducer head assembly 120 to define the location and width of each data track on the patterned media 108 also permits the storage device 100 to advantageously use the same servo methods and head actuation methods as conventional recording, which are more relaxed (less stringent and complex) than those common in patterned media devices.

Figure 2A:
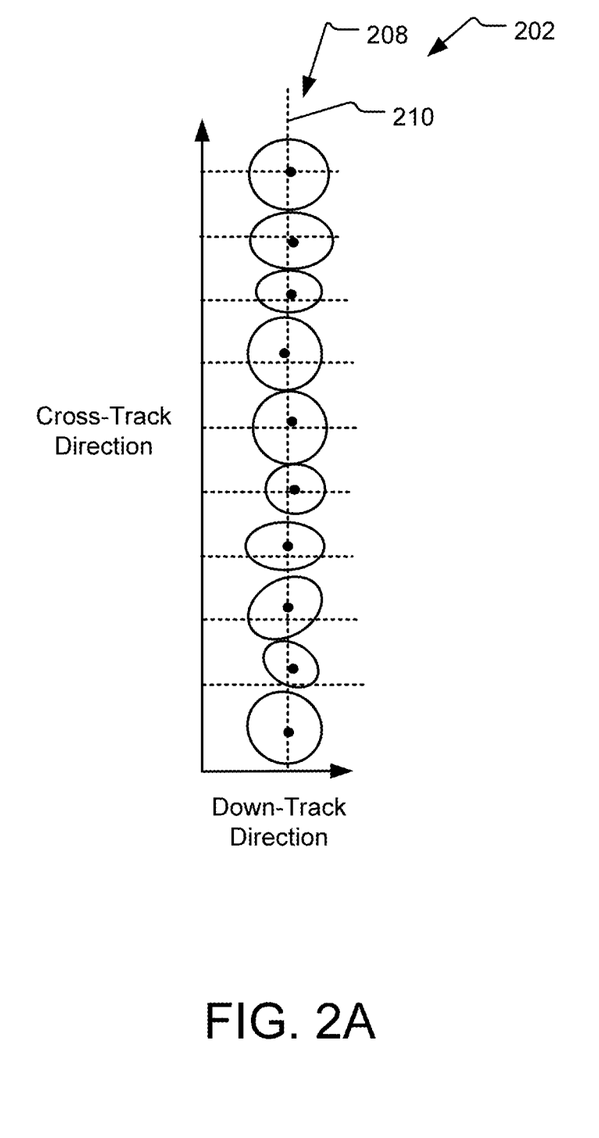
FIG. 2A illustrates an example of magnetic grains that are substantially aligned in the cross-track (radial) direction of a patterned media.
Figure 2B:
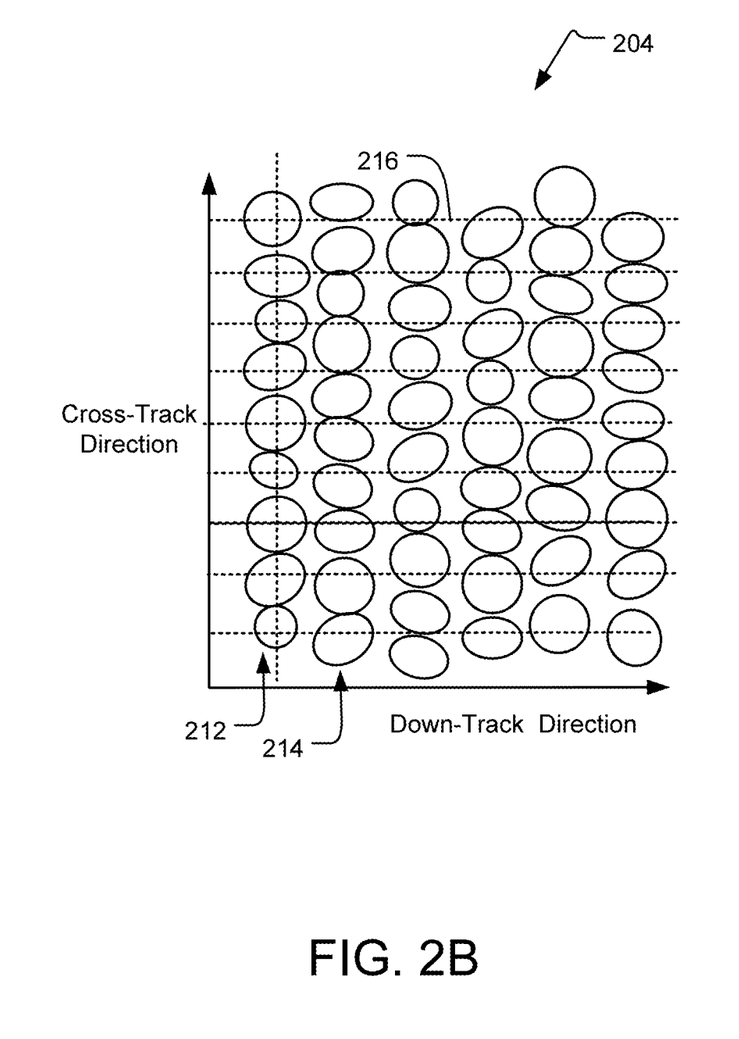
FIG. 2B illustrates an example of magnetic grains that are substantially aligned in the cross-track direction but that are staggered in the down-track direction.
Figure 2C:
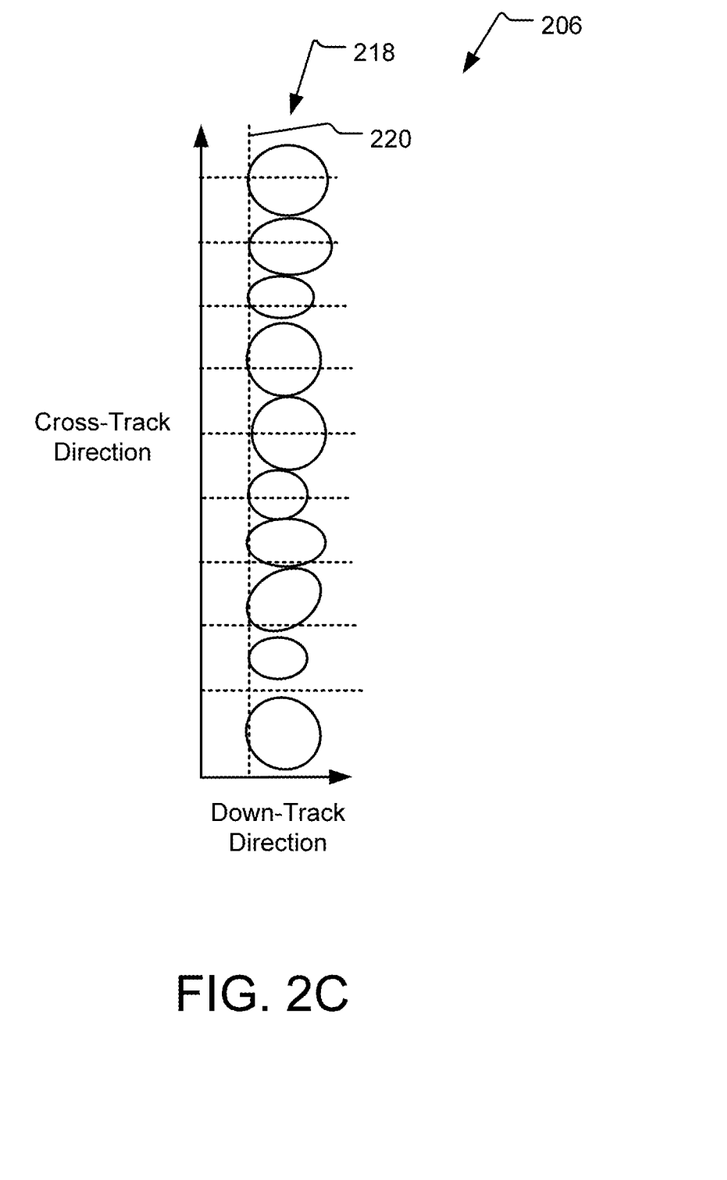
FIG. 2C illustrates another example of magnetic grains that are substantially aligned in the cross-track direction.

FIG. 2A-2C illustrate examples of magnetic grain arrangements in bit-patterned media. The magnetic grain arrangements include magnetic islands or grains that may be arranged (e.g., grown) on a storage medium (e.g., the patterned media 108 of FIG. 1) at fixed locations. The magnetic grains are, in one implementation, each separated from one another by non-magnetic material.

FIG. 2A illustrates an example of magnetic grains 202 that are substantially aligned along a radial (cross-track) direction axis 210. These grains are said to be substantially aligned with the radial-direction axis 210 because each of the grains in a single cross-track column 208 intersects the radial-direction axis 210 at a point that corresponds to at or near the center of the grain. In one implementation, each of the grains in the cross-track column 208 has a diameter approximately 6 nm, and a center that is within +/−1 nm of the radial-direction axis 210. In other implementations, the grains assume a variety of different sizes but each have a center that offset by the radial-direction axis 210 by no more than +/−15 percent of the average grain size.

FIG. 2B illustrates an example of magnetic grains 204 that are substantially aligned in the cross-track (radial) direction but that are staggered (e.g., not substantially aligned) in the down-track direction. Although a radial-direction axis can be drawn to substantially intersect all of the grain centers along a common column (e.g., radial direction columns 212, 214), a down-track-direction axis cannot be drawn to substantially intersect all of the grain centers along a common row. For example, grain centers are staggered relative to the down-track axis 216. According to one implementation, this radial-direction alignment within individual rows of grains is the result of a media manufacturing process that makes use of grain-growth-constraining features to limit size and position of each one of the magnetic grains in the down-track direction while allowing the grains to grow unconstrained in the radial direction.

FIG. 2C illustrates another example of magnetic grains 206 that are substantially aligned in the cross-track (radial) direction. In contrast to FIG. 2A where the grain centers each substantially align along a radial axis of the patterned media, the implementation of FIG. 2C is one in which the edges of grains of a column 218 substantially align with a radial-direction axis 220. In one implementation, each of the grains in the column 218 has a diameter of approximately 6 nm, and an edge that is within +/−1 nm of alignment with the radial-direction axis 210.

Figure 2D:
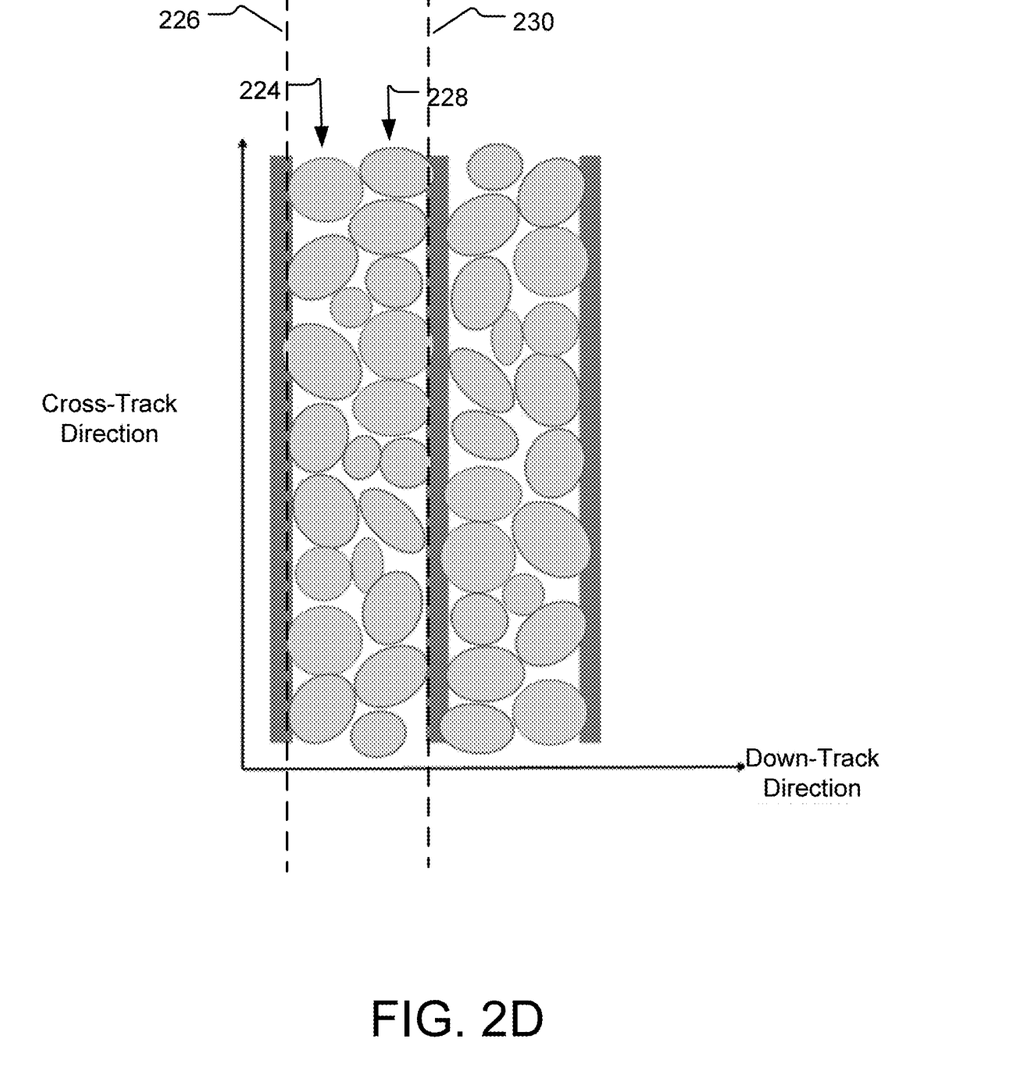
FIG. 2D illustrates still yet another example of magnetic grains that are substantially aligned in the cross-track direction.

FIG. 2D illustrates still yet another example of magnetic grains 222 that are substantially aligned in the cross-track direction. Here, the left-side edges of grains in a column 224 substantially align with a radial-direction axis 226 and the right-side edge of grains in a column 228 substantially align with a radial direction axis 230.

Figure 3:
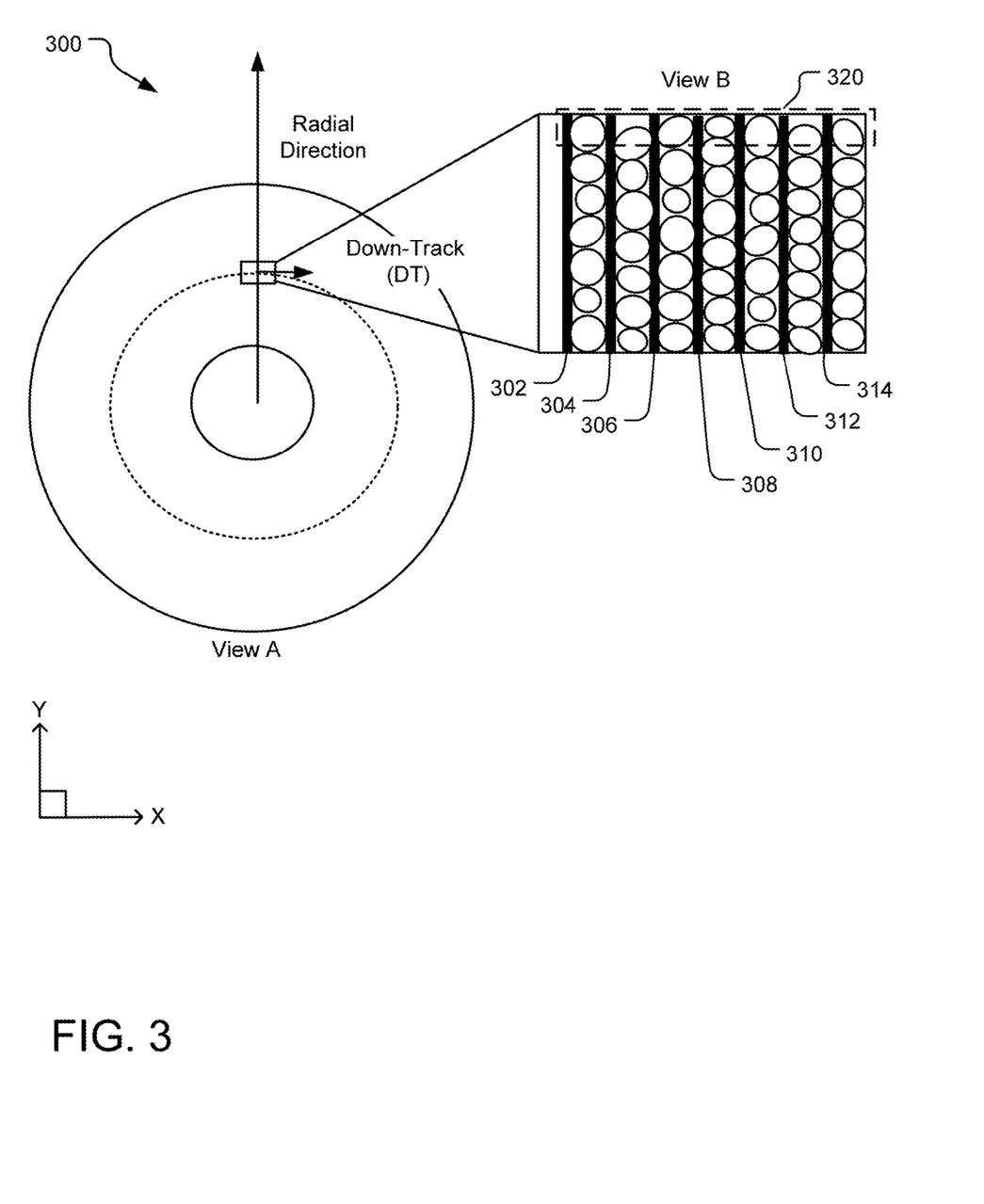
FIG. 3 illustrates another example patterned media with magnetic grains that are substantially aligned along individual rows extending in a radial (cross-track) direction of a disk due to the presence of grain growth grain-growth-constraining features during a patterned media manufacturing process.

FIG. 3 illustrates another example patterned media 300 with magnetic grains that are substantially aligned along individual rows extending in a radial (cross-track) direction of a disk due to the presence of grain growth grain-growth-constraining features 302, 304, 306, 308, 310, 312, 314 during a patterned media manufacturing process. The grain-growth-constraining features 302, 304, 306, 308, 310, 312, 314 are patterned features on the patterned media 300 that effectively constrain the permissible the down-track position of each individual grain during a manufacturing process (e.g., by setting a permissible upper and lower down-track direction position limit for each grain). As with the other examples provided herein, the grains on the patterned media 300 (shown in detail in expanded view B) are constrained in exclusively the down-track direction during formation. Consequently, the grains are aligned in rows extending in the radial direction of the disk. Here, grain growth is unconstrained in the radial direction and the grains in neighboring radial-direction rows (e.g., grains in a column 320) are not aligned in the down-track direction. Stated differently, the grains centers and edges are staggered relative to any given down-track direction axis.

Figure 4:
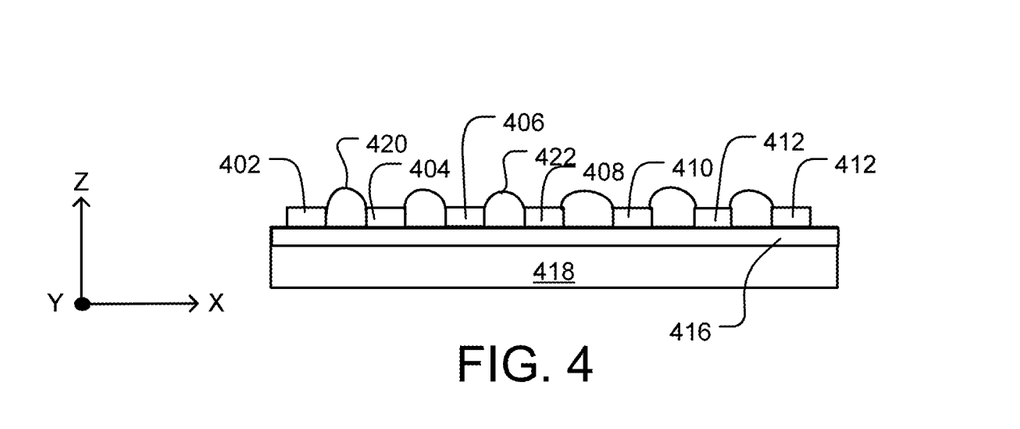
FIG. 4 illustrates a cross-sectional view of a patterned media formed via a first exemplary grain growth manufacturing process.
Figure 5:
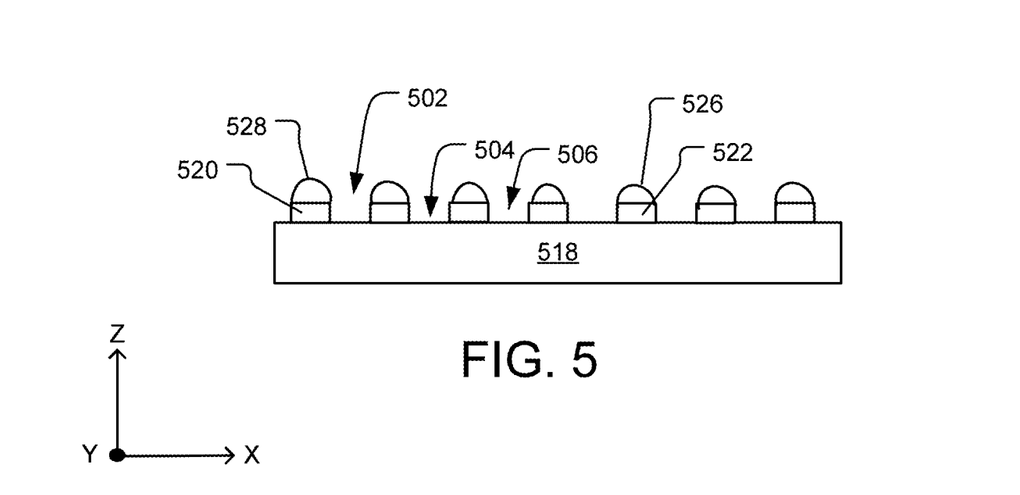
FIG. 5 illustrates yet another a cross-sectional view of a patterned media formed via another exemplary grain growth manufacturing process.

In the example of FIG. 3, the grain-growth-constraining features 302, 304, 306, 308, 310, 312, 314 may be either positively-patterned features (e.g., features built by adding material to a surface) or negatively-patterned features (e.g., features that formed by removing material from a surface). FIG. 4 illustrates one example of grain-growth-constraining features that are positively-patterned and FIG. 5 illustrates one example of grain-growth-constraining features that are negatively-patterned.

FIG. 4 illustrates a cross-sectional view of a patterned media 400 formed via a first exemplary grain growth manufacturing process. According to one implementation, the patterned media 400 has features the same or similar to those described with respect to the patterned media 300 of FIG. 3. In the process exemplified by FIG. 4, a seed layer 416 is deposited onto a substrate 418 using a thin film deposition process. For example, the seed layer 416 may be deposited by sputtering, chemical vapor deposition (CVD), plasma enhanced chemical vapor deposition (PECVD) or any other suitable thin film deposition process. Although a variety of suitable seed layer materials exist, example material include without limitation Ru, NiFe, Ta50\Au199, Ta50\NiFe1000, Ta50\Ru1000, Ta50\Cu1000, Indium Tin Oxide, combinations thereof or other seed materials. Segregant material is then patterned on the seed layer 416 to form the positive (e.g., surface-protruding) grain-growth-constraining features 402, 404, 406, 408, 410, 412, 414. Although a variety of segregant materials may be suitable for such purpose, example materials include without limitation, nitrides, carbides, borides, such as BN, AlN, B2O3, TiO2, SiO2, SiB3, BC, SiC, AlOx, etc.

The patterning of the grain-growth-constraining features 402, 404, 406, 408, 410, 412, 414 may be achieved using a variety of different techniques including without limitation lithography, nanoimprint, block copolymer, and other methods. In one implementation, the grain-growth-constraining features 402, 404, 406, 408, 410, 412, 414 are elongated (e.g., line-like) features that extend parallel to the radial direction of the patterned media, as shown.

After the grain-growth-constraining features are patterned, a hard magnetic material may be deposited, causing magnetic grains (e.g., grains 420, 422) to nucleate at growth sites between the various grain-growth-constraining features 402, 404, 406, 408, 410, 412, 414. In various implementations hard magnetic material may have one or more elements selected from the group Fe, Ta, Ni, Mo, Pt, W, Cr, Ru, Ti, Si, O, V, Nb, Ge, B, Cu, Ag and Pd and/or may be an alloy comprising Fe, Pt, and/or Cr.

According to yet another implementation, the seed layer 416 is deposited on the stack after the grain-growth-constraining features 402, 404, 406, 408, 410, 412, 414 have been patterned (e.g., rather than before such patterning), such as according to methodology the same or similar to that described within U.S. Pat. No. 9,245,566, which is hereby incorporated by reference for all that it discloses and teaches. In one such process, the seed layer 416 nucleates to be thicker over the growth sites between the grain-growth-constraining features 402, 404, 406, 408, 410, 412, 414 than within regions on top of the grain-growth-constraining features 402, 404, 406, 408, 410, 412, 414 and this difference in relative thickness of the seed layer causes the subsequently-deposited magnetic material to nucleate and grow between the grain-growth-constraining features 402, 404, 406, 408, 410, 412, 414, forming the radially-aligned rows of magnetic grains illustrated with respect to FIG. 3.

FIG. 5 illustrates yet another a cross-sectional view of a patterned media 500 formed via another exemplary grain growth manufacturing process. According to one implementation, the patterned media 500 has features the same or similar to those described with respect to the patterned media 300 of FIG. 3. In the process exemplified by FIG. 5, a seed layer is deposited on a substrate 518, and an etching process is employed to remove portions of the seed layer leaving behind raised seed layer portions 520, 522, etc. As a result of this etching, hollow elongated channels (e.g., one of channels 502, 504, 506, etc.) are formed in the y-direction across the substrate. Thee hollow elongated channels (e.g., channels 502, 504, 506) are one example of negatively-formed patterned features that may serve to constrain magnetic grain growth in a single direction. When magnetic material is subsequently deposited on top of the substrate 518 and the raised seed layer portions 520, 522, etc., the magnetic material nucleates in the regions on top of the raised seed layer portion 520, 522. Consequently, one or more rows of radially-aligned magnetic grains (e.g., magnetic grains 526, 528) are formed on top of each raised seed layer portion, such that the row extends in the radial direction (y-direction, into the page) of FIG. 5.

Figure 6:
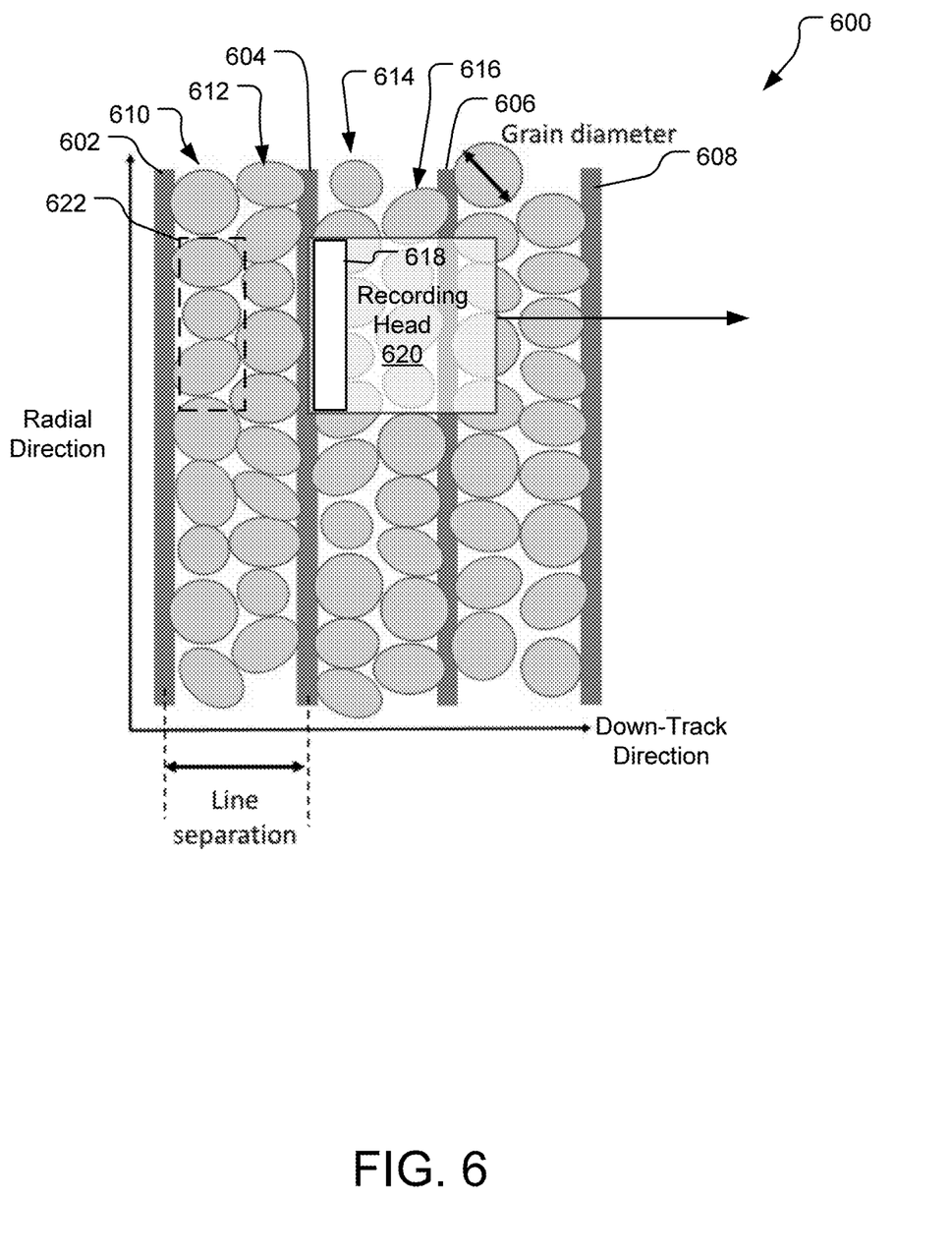
FIG. 6 illustrates another example patterned media with magnetic grains that are substantially radially-aligned due to the grain-growth-constraining features that constrain the position of magnetic grains in the down-track direction of the patterned media during a semiconductor manufacturing process.

FIG. 6 illustrates another example patterned media 600 with magnetic grains that are substantially radially-aligned due to patterned lines of grain-growth-constraining features 602, 604, 606, 608 that constrain the position of magnetic grains in the down-track direction of the patterned media during a semiconductor manufacturing process.

The implementation of FIG. 6 differs from that shown with respect to FIGS. 1 and 3-5 in that a larger separation is employed between the adjacent grain-growth-constraining features so as to allow for multiple radial-direction rows of grains to nucleate and grow in substantial alignment between each individual line pair of the grain-growth-constraining features 602, 604, 606, 608. In the example of FIG. 6, down-track separation between adjacent pairs of the constraining features (labeled "line separation") is set to approximately equal twice the average natural magnetic grain diameter such that two rows of grains may form in the space between two adjacent constraining features. For example, two rows 610, 612 of substantially radially-aligned magnetic grains are formed in a space between the first pair constraining features 602, 604; two more rows 614, 616 of substantially radially-aligned magnetic grains are formed in the space between the second pair constraining features 604, 606, and so on.

In the illustrated implementation, the patterned media 600 may be implemented within a storage device having a controller that controls a writer 618 on a recording head 620 to generate magnetic pulses to transition magnetic polarity of multiple grains at once. Here, a single data bit of information may be represented by the polarity of all grains a region 622 encompassing grains that are both (1) between a same pair of the grain-growth-constraining features (e.g., between 602 and 604); (2) in substantial radial alignment along a column 610; and (3) that have a radial position corresponding to a size of the writer 618 (e.g., those grains close enough to the writer 618 to be jointly transitioned in polarity when the writer passes overhead, as generally shown). In another implementation, a single data bit of information may be represented by grains in more than one radial-direction row (e.g., by the polarity of grains in a region spanning two or three rows of grains between a same pair of the grain-growth-constraining features. Notably, the effective track width (e.g., radial-direction width of the region 622) is, in this implementation, determined independent of the grain size and independent of patterned media as a whole. Rather, the center and width of each data track can be based on the dimensions and position of the recording head 620 rather without consideration of the size and/or radial position of each individual magnetic grain.

Relaxing the separation between the constraining features 602, 604, 606, 608, as shown, may simplify manufacturing (e.g., by reducing the density of grain-growth-constraining-features to be patterned), which effectively reduces total manufacturing costs. Provided that the spacing interval between each pair of constraining features is set to equal or substantially equal (e.g., +/−5%) an integer-number multiple of the average grain diameter, and provided that the integer number is relatively low (e.g., 2 grains, 3 grains, 4 grains), a corresponding number of rows of substantially radially-aligned grains may form within each such interval. In these cases, the resulting grain pattern may provide the same or similar performance and cost benefits as those discussed with respect to FIG. 1.

In one implementation, the grain-growth constraining features are used by a servo system of a storage device to provide write-sync timing for the individual write transitions in lieu of a "write sync field" that is used in traditional BPM devices. In general, BPM devices require such precise timing between the write pulse and the passage of the center of a magnetic grain below the write head that a write sync field is typically included within each data sector to inform the storage controller of the start of the data portion of that sector. In the present system, the lines of grain-growth-constraining features force a regular separation between the magnetic grains in the down-track position such that the start of each radial-direction row 610, 612 is predictable. If the servo pattern is written on bits within this same predictable sequence of patterned bits as the user data, the servo field sync mark can then be deterministically synced with the start of each user data region. For example, during a write to a given data track sector, the storage controller may detect servo pattern information at the start of the sector and, from this pattern, be able to accurately predict timing and location information for the passage of the first data bit (e.g., bit allocated for storage of user data) of the sector. In this sense, the patterning of magnetic grains on the magnetic media allows renders the traditional write sync field unnecessary, allowed for more total space on the media to be allocated toward storage of user data.

Notably, if the spacing between the grain-growth-constraining features becomes too large, the resulting pattern may lose order in the radial direction making the transition timing less reliable in relation to the grain-growth constraining features.

Figure 7:
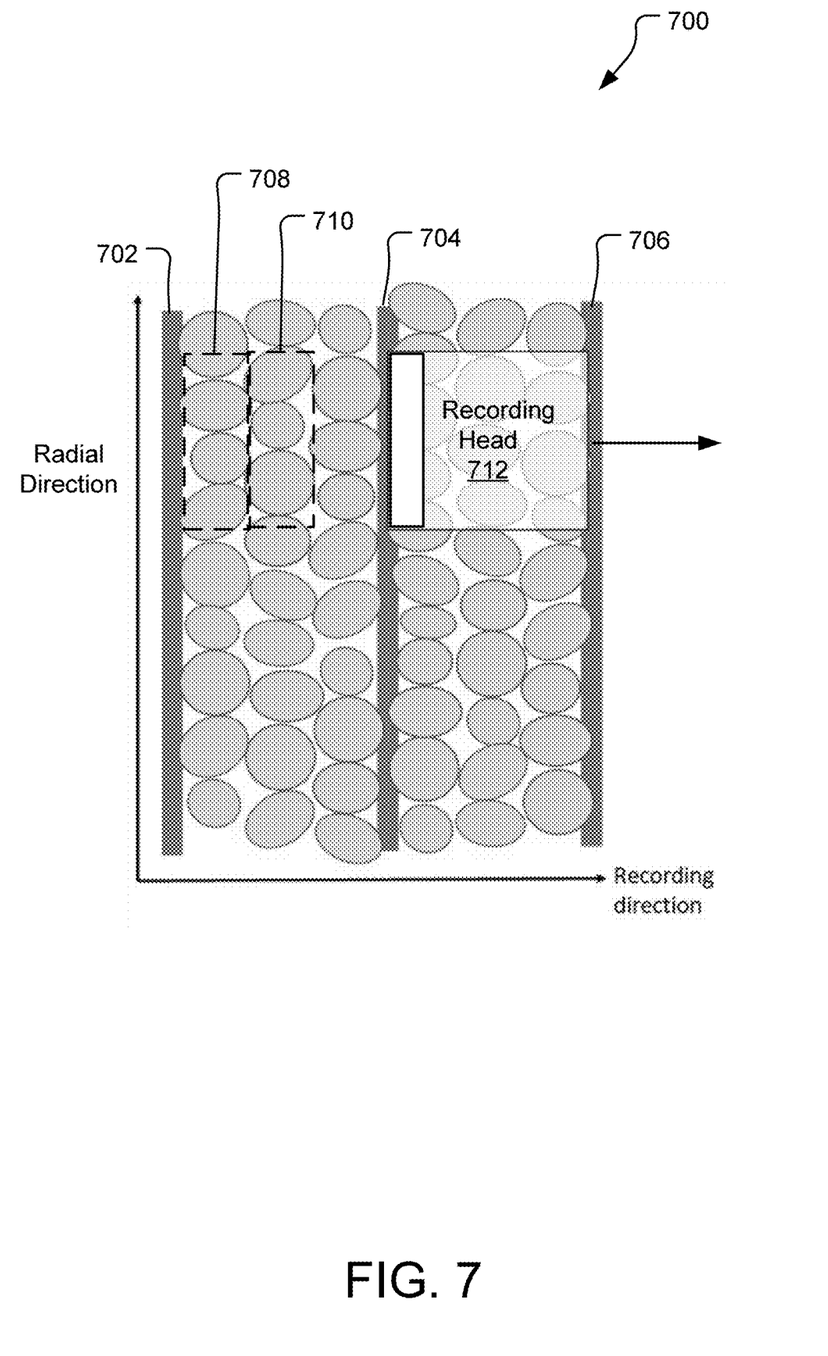
FIG. 7 illustrates yet another example patterned media with magnetic grains that are substantially radially-aligned due to the grain-growth-constraining features that constrain the position of magnetic grains in the down-track direction of the patterned media during a semiconductor manufacturing process.

FIG. 7 illustrates yet another example patterned media 700 with magnetic grains that are substantially radially-aligned due to lines of the grain-growth-constraining features 702, 704, 706 that constrain the position of magnetic grains in the down-track direction of the patterned media during a semiconductor manufacturing process. In the example of FIG. 7, down-track separation between adjacent pairs of the constraining features (labeled "line separation") is set to equal approximately three times the average natural magnetic grain diameter such that three rows of grains may form in the space between two adjacent grain-growth-constraining features. Like FIG. 6, the radial width of each data track is determined by the size of a writer (not shown) on the recording head 712 and may be entirely independent of the size of individual grains on the patterned media. In this case, the region 708 may store a first data bit, 710 may store a second data bit, etc.

Figure 8:
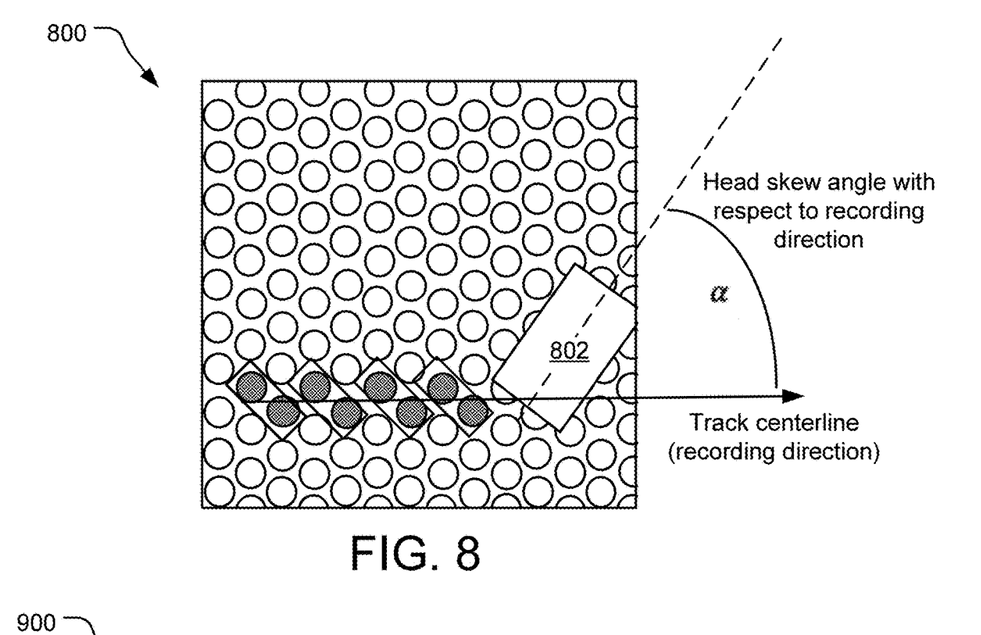
FIG. 8 illustrates a recording head writing data to a series of bits in a patterned media recording system.

FIG. 8 illustrates a recording head 802 writing data to a series of bits in a patterned media recording system 800. In FIG. 8, the recording head 802 is writing data in a down-track direction, and two magnetic grains are used to represent each individual data bit. When the patterned media has a linear pattern of bits similar to that shown in FIG. 8 across the surface of the disk, the recording head 802 has a skew angle α (e.g., an angle between the axis of the recording head 802 and a tangent to an underlying row of magnetic grains on the patterned media) that changes as the actuator arm 806 moves the recording head 802 between inner diameter and outer diameter of the media.

Since writes to a patterned media generally depend on an exact alignment between one or more target magnetic grains and the write element (e.g., positioned on end of the recording head, as shown), some patterned media systems may include servo systems with sophisticated, dynamic micro-actuation controls that alter the fine positioning of the recording head to ensure that the desired alignment is achieved with underlying grains despite the changing skew angle across a range of positions. The reason for this dynamic correction for changing skew angle is illustrated further in FIG. 9.

Figure 9:
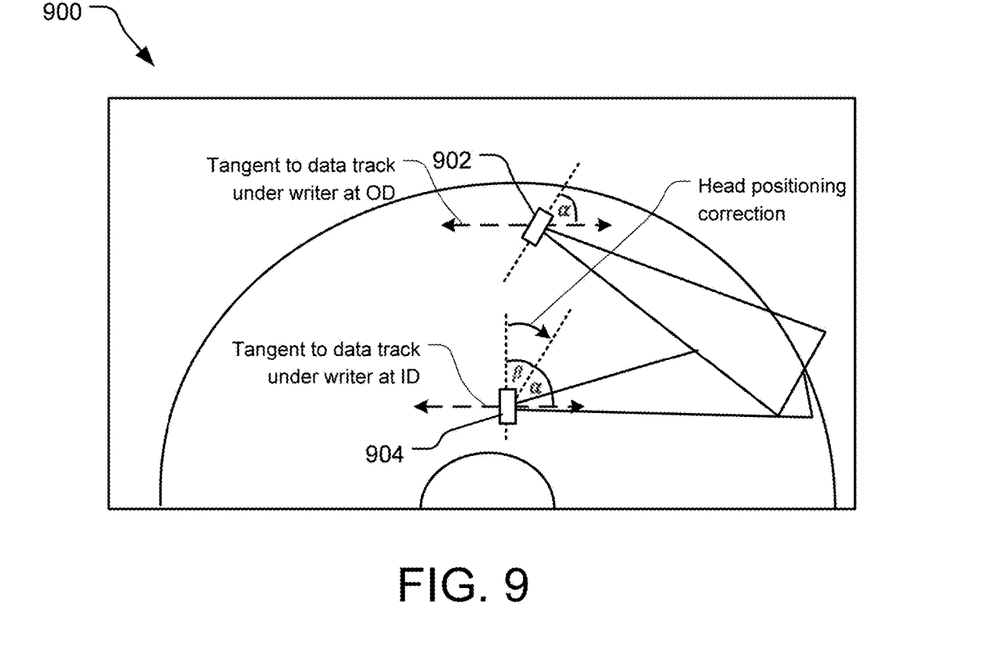
FIG. 9 illustrates dynamic head-positioning corrections that may be used in some patterned media storage devices to compensate for changing skew angle at different radial positions.
Figure 10:
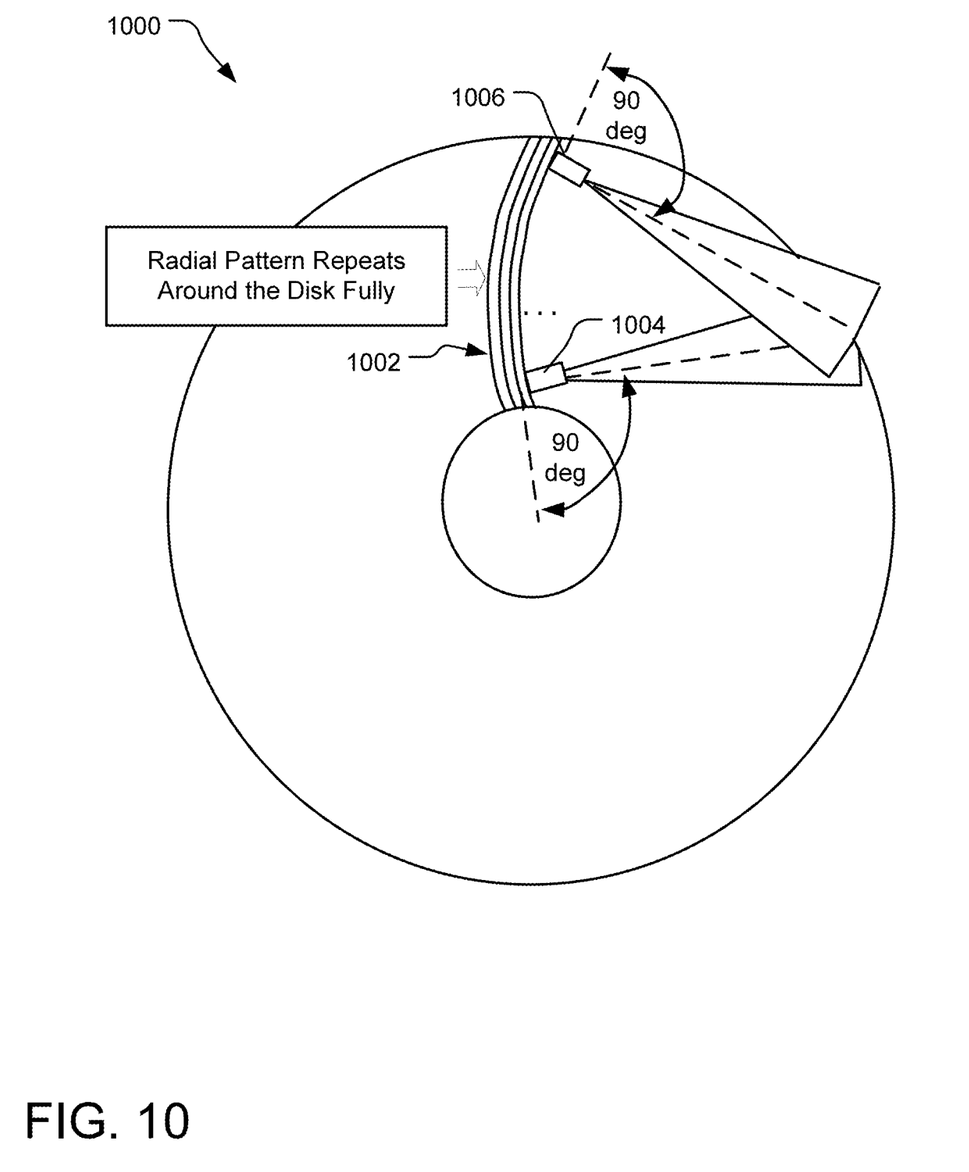
FIG. 10 illustrates an arched pattern of grain-growth-constraining features on a patterned media that may be used, during manufacturing, to generate a pattern of magnetic grains that eliminates the need for head skew actuation as function of radial head position.
Figure 11:
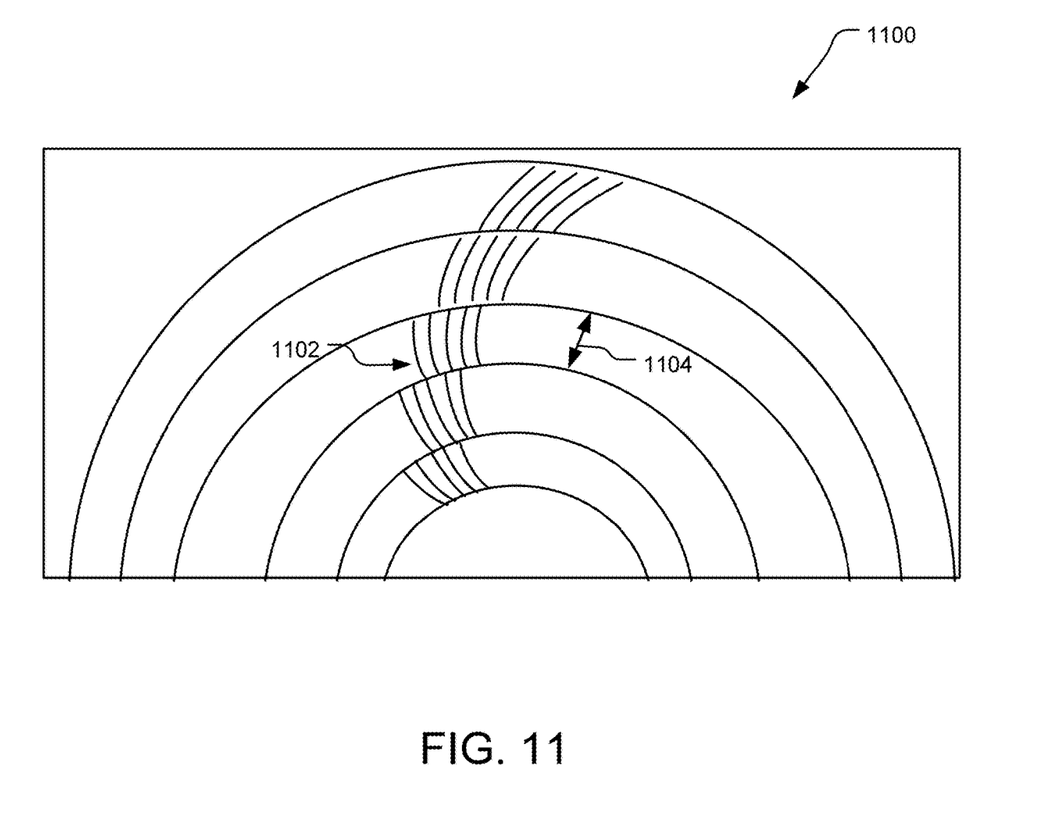
FIG. 11 illustrates additional patterns of grain-growth-constraining features on a patterned media that eliminate the need for head skew actuation as function of radial head position.

FIG. 9 illustrates dynamic head-positioning corrections that may be used in some patterned media storage devices to compensate for changing skew angle at different radial positions. At a first head position 902 near the outer diameter of a disk, the recording head assumes a first skew angle α with respect to the underlying data track. At a second head position 904 near the inner diameter of the disk, the skew angle is naturally different (e.g., skew angle is naturally+β). In order to maintain the same angle of the recording head relative to the magnetic grains on of the underlying data track, the head may be dynamically adjusted by a correction angle β. FIG. 10-11 propose pattern feature designs that may eliminate the need to dynamically adjust the head in this manner.

FIG. 10 illustrates an arched pattern of grain-growth-constraining features 1002 on a patterned media 1000 that may be used, during manufacturing, to generate a pattern of magnetic grains that eliminates the need for head skew actuation as function of radial head position (e.g., to eliminate the need for the dynamic positional corrections described above with respect to FIG. 8-9). When the positions of magnetic grains are constrained by the grain-growth-constraining features 1002 shaped as illustrated, the resulting magnetic grains assume a pattern that guarantees that the writer on the head assumes the same angle with respect to an underlining radially-aligned track of bits regardless of whether the head is positioned at an ID position 1004, an OD position 1006, or any position therebetween. Here, the magnetic grains are radially aligned at a track-local level (e.g., the alignment is substantially in the radial direction when examined locally relative to a small section of a data track being written) but curved at the global level between inner and outer diameter of the disk. Consequently, there exists a uniform angle between the recording head and the underlying row of magnetic grains at all radial positions. Here, the arc-type radial pattern is shaped to ensure that the write element remains parallel to the lines of the grain-growth-constraining features and therefore parallel to the grain columns at the point of recording when the recording element is moved from the ID to the OD of the disk. This arc patterning eliminates the need for head skew actuation as a function of head position from ID to OD.

FIG. 11 illustrates additional patterns of grain-growth-constraining features 1102 on a patterned media 1100 that may allow for variations in bit pitch in different radial zones. In FIG. 11, the grain-growth-constraining features (referred to below as "lines") are patterned differently within different radial bands (e.g., a radial band 1104) on the disk. In one implementation, the spacing between individual lines is varied in order to maintain constant line pitch as a function of disk radius. For example, the patterned lines may have a slightly lower pitch in a radial zone closest to the inner diameter where data rate is lower and the signal-to-noise (SNR) ratio is naturally higher. Due to this higher SNR, the media can support a higher linear density of bits within the ID radial zones than the outer radial zones. Thus, the patterned lines may generally increase in pitch (e.g., separation) with radial zones increasingly closer to the outer diameter where the data rate is higher, SNR is lower, and linear density is lower to ensure high system performance.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of forming a bit patterned media comprising:
   constraining growth of magnetic grains in a down-track direction of the patterned media without constraining growth of the magnetic grains in a radial direction of the patterned media to cause the magnetic grains to substantially align in rows extending to form an arched pattern in the radial direction, each one of the magnetic grains being magnetically isolated from one another by non-magnetic material within each individual one of the radial-direction rows.

2. The method of claim 1, wherein the magnetic grains in the rows have either grain centers in substantial alignment with one another or grain edges in substantial alignment with one another.

3. The method of claim 1, wherein constraining the magnetic grain growth further comprises patterning lines of grain-growth-constraining features, the lines of grain-growth-constraining features separating the rows of magnetic grains from one another.

4. The method of claim 3, wherein the grain-growth constraining features are patterned exclusively in the radial direction of the patterned media.

5. The method of claim 3, wherein the grain-growth-constraining features are positive features formed by adding material to a layer of the patterned media.

6. The method of claim 3, wherein the grain-growth-constraining features are negative features formed by removing material from a layer of the patterned media.

7. The method of claim 1, wherein a separation between the grain-growth-constraining features increases as a function of radial distance from an inner diameter of the patterned media.

8. A system comprising:
   a patterned media including magnetic grains being substantially aligned in rows extending in a radial direction, each one of the magnetic grains being magnetically isolated from one another by non-magnetic material within each individual one of the radial-direction rows, the magnetic grains lacking substantial alignment in a recording direction; and
   a read/write controller configured to control a write head to write an individual data bit on the patterned media by transitioning a group of the magnetic grains to a same magnetic polarity, the group of magnetic grains having a radial width defined independent of the patterned media that is based on a dimension of the write head.

9. The system of claim 8, wherein the group of magnetic grains storing data of the individual data bit are substantially aligned along a same radial-direction row on the patterned media.

10. The system of claim 8, wherein the read/write controller is configured determine a time at which to initiate the write of the individual data bit by deriving write sync information from a servo sync field.

11. The system of claim 8, wherein the magnetic grains aligned in the rows have either grain centers in substantial alignment with one another or grain edges in substantial alignment with one another.

12. The system of claim 8, wherein the patterned media further includes
   grain-growth-constraining features separating the rows of magnetic grains from one another.

13. The system of claim 12, wherein the grain-growth-constraining features extend exclusively in the radial direction of the patterned media.

14. The system of claim 8, wherein the rows of magnetic grains extending in the radial direction form an arched pattern.

15. A system comprising:
   a patterned media including magnetic grains being substantially aligned in rows extending in a radial direction, the magnetic grains within each of the radial-direction rows being magnetically isolated from one another by non-magnetic material;
   a read/write controller configured to control a write head to write an individual data bit on the patterned media by transitioning a group of the magnetic grains, the group of magnetic grains having a radial width defined based on a dimension of the write head, the radial width of the group of grains being independent of grain size on the patterned media.

16. The system of claim 15, wherein the magnetic grains lack substantial alignment in a recording direction.

17. The system of claim 15, wherein the group of magnetic grains storing data of the individual data bit are substantially aligned along a same radial-direction row on the patterned media.

18. The system of claim 15, wherein the read/write controller is configured determine a time at which to initiate the write of the individual data bit by deriving write sync information from a servo sync field.

* * * * *